3,783,108
METHOD AND APPARATUS FOR DISTILLING
FRESHWATER FROM SEAWATER
Esko Ensio Huhta Koivisto, Lumikintie 6A77, Helsinki 82, Finland, and Risto Väino Juhani Saari, Luomo, Harjula, Finland
Continuation-in-part of application Ser. No. 873,174, Nov. 3, 1969. This application Jan. 18, 1971, Ser. No. 107,060
Int. Cl. B01d 3/06
U.S. Cl. 203—11    11 Claims

ABSTRACT OF THE DISCLOSURE

A continuous flow of warm seawater—for instance, water from the surface—is fed upwards from a supply of the warm water through a column to degassers positioned at different levels. The warm water is fed from the lowest to the highest degasser, in which gradually decreasing partial pressures, that are higher than the partial pressures of the warm water are established. The non-condensable gasses released in the degassers are removed and the warm water is raised further through the column to evaporators through which the warm water is passed in turn. In the evaporators, gradually decreasing pressures corresponding to the gradually decreasing partial pressure of the water vapor in them are maintained. The waste water from the last evaporator is returned to the sea downwards through another column and the vapors from each evaporator are conducted separately to a corresponding condenser operated by indirect heat exchange, using a continuous stream of cold seawater obtained from the sea. Residual non-condensable gasses released on the vaporization of the warm water are removed from the condensers and the freshwater is collected from the condensers.

CROSS REFERENCES TO RELATED APPLICATIONS

This application is a continuation-in-part of the applicants copending application, Ser. No. 873,174, filed Nov. 3, 1969.

BACKGROUND OF THE INVENTION

Field of the invention

This invention relates to a method and an apparatus for producing freshwater by distilling seawater continuously.

DESCRIPTION OF THE PRIOR ART

Several methods have been developed recently to produce freshwater from seawater. The most economical have been distillation associated with power stations, particularly big nuclear power stations. These methods require high investment in the power plant and markets for the electrical energy.

Other sources of energy have therefore been sought. One vast source of energy is the heat stored in the surface layers of the sea. Most of this energy is stored in a surface layer 100–200 meters deep, below which lies stable, colder water. This thermocline is almost constant in tropical waters, where the differences in temperature between the surface water and that lying 100–200 meters further down is 10–14° C. The temperature difference can be increased by damming surface water to form a basin in which the sun's rays can warm it.

Prior-known methods of exploiting this heat energy source and temperature difference have been presented in earlier publications, such as U.S. Pat. 3,138,546 and 3,248,307. To produce freshwater economically from seawater, however, the following problems should be solved:

When seawater is distilled simply by evaporating warm surface water and condensing the vapor thus produced, the natural temperature difference is utilized in three steps: the drop in temperature of the warm water in the evaporator, the difference in temperature between the vapor and the condenser, and the rise in temperature of the cooling water in the condenser. Where the temperature difference is 10° C., for instance, 3° C. can be used for evaporation in one stage without the size of the condenser or the quantity of cooling water in it becoming unreasonably large. To make the process economical the temperature difference should be used more effectively.

As the heat of evaporation of the water at such a low temperature is almost 600 Kcal. per kilogram, 0.5% of the water flowing through the evaporator can be evaporated. Thus the quantity of water flowing through the evaporator is 200 times that of the freshwater produced. This means that the pumping procedure must be as simple as possible.

At atmospheric pressure, about 15 ml. of non-condensable gasses from the air are dissolved in every liter of seawater. At the pressure of water vapor—say 0.03 ata.—these non-condensable gasses are liberated when the water is evaporated, so that they occupy a volume of 0.5 liter for every liter of water. In other words, where the quantity of water treated in the evaporator is 200 times that of the freshwater obtained, the volume of non-condensable gasses is 100 times that of the water produced. If these gasses are not removed, they accumulate in the vapor spaces of the evaporator and condenser, and their partial pressure raises the pressure to above that of vaporization, so that no more water is able to evaporate in the evaporator. For this reason, the water cannot be evaporated effectively (kept boiling) in a partial vacuum created merely by a barometric height difference. Unless the non-condensable gasses are removed, an excessively large evaporator is needed.

A common method—used in power plants, for example—is to remove the non-condensable gasses from the condenser after they have passed through it. This may raise the ratio of non-condensable gasses to the total removed to 40%, the remaining 60% being water vapor. The method has also been applied in certain prior-known distillation processes. It is technically quite possible, but pumping such a large quantity of non-condensable gasses out of the condenser at a pressure difference of nearly 1 ata. requires so much energy that the cost of this work alone, in relation to the quantity of freshwater produced, is roughly the same as the total costs of the most economical known methods of desalination. Furthermore, the large amount of non-condensable gasses in the vapor reduces the heat-exchange coefficient of the condenser and increases its size.

In U.S. Pat. 3,344,584, there is disclosed a method and an apparatus for degassing and distilling seawater, wherein a flow of seawater is pumped upwards to a low pressure region to release non-condensable gasses therein and a portion of the water is evaporated in this region. The evaporated portion is then separated, condensed and recovered as freshwater. The unevaporated seawater is returned to the sea from the low pressure region through a barometric leg. Finally the non-condensable gasses are removed from the low pressure region and mixed with the downward flow in the barometric leg.

In the latter method and apparatus only one flow of seawater is used. Thus the vapors are condensed to freshwater by means of the incoming flow of cooler seawater, in which case the flow must be heated before it is introduced into the low-pressure region. The non-condensable gasses released in the low-pressure region and carried with the vapors to the condenser are removed and mixed with the downward flow in the barometric leg.

Owing to the high temperature of seawater leaving the evaporator, however, it is impossible to achieve a pressure in the barometric leg low enough for the gasses to flow into the downward-flowing water without a blower to raise their pressure up to the level prevailing at the point of the ingestor in the leg.

It is also noted that the temperature difference in the sea has not been utilized for the evaporation and condensation; there is only one flow of seawater.

SUMMARY OF THE INVENTION

In the present invention freshwater is produced in the following steps:

Seawater pumped from the warm surface layers of the sea, or from a basin warmed by the sun or warmed by the low-temperature waste heat of a power plant or industrial process, is evaporated and the vapor produced is condensed by colder seawater.

Non-condensable gasses dissolved in the water to be evaporated are removed before the water enters the evaporators and after the gasses have passed through the condensers.

The water to be evaporated flows through a plurality of consecutive evaporators located at a roughly barometric height above sea level, in which part of it is evaporated and the rest returned to the level from which it was pumped into the evaporators.

The vapor produced in the evaporators is condensed in corresponding condensers, which are cooled by colder seawater.

The non-condensable gasses can be pumped out by mixing them with the cooling water leaving the condensers.

Compared with prior known methods for the production of fresh water by distilling seawater, this invention offers three principal advantages:

First, the warm seawater is evaporated in several consecutive stages, and the vapor produced at each stage is condensed by colder water in a separate condenser stage. This enables a more economical use of the available temperature difference. The quantities of water to be treated and of non-condensable gasses to be removed are reduced substantially in ratio to the fresh-water produced.

Secondly, the bulk of the non-condensable gasses dissolved in the water is removed before the water enters the evaporator, and it is removed at pressures greater than that of the vapor. This substantially reduces the pressure differences at which the gasses have to be pumped out and avoids pumping large quantities of vapor out with the gasses. Since the partial pressure of the gasses does not prevent the water from evaporating, the evaporators can be made small. Neither do the non-condensable gasses impede the operation of the condenser.

The non-condensable gasses released from the water are removed by mixing them with the cooling water flowing downwards from the condensers into the sea. By regulating the feed pressure of the ejector, the pressure at the point where the gases and water are mixed can be reduced to the vapor pressur of the cooling water, and the gasses are mixed with the water in the form of bubbles, without a blower. Most of the work of pumping is done by the water column formed of the cooling water, which compresses the bubbles as it flows downwards.

It is rational to build big distilling plants of several parallel modules, but if each module has its own warm- and cool-water pumps, the number of pumps is large—which increases investments and maintenance costs, and decreases the reliability of the plant.

The third advantage of the present invention is that the distilling plant itself—even a big one—can be built entirely without conventional pumps, so that it contains no moving parts whatever. The warm and cool water require one pump each, and these can be installed in a separate pumping station outside the distilling plant. In big plants they can be made very large, with high efficiencies, which reduces the energy costs.

For the above reasons, the method according to the invention enables freshwater to be obtained from seawater economically using the vast heat reserves of the sea as the source of energy. About 99.5% of the energy needed for evaporating the water is taken from the sea and only about 0.5% is required for pumping the water and gasses. The importance of the invention is enhanced by the fact that it can be applied using conventional equipment of the processing industries, such as pumps, evaporators, ejectors and condensers.

DESCRIPTION OF THE PREFERRED EMBODIMENT

First embodiment

Figure 1:
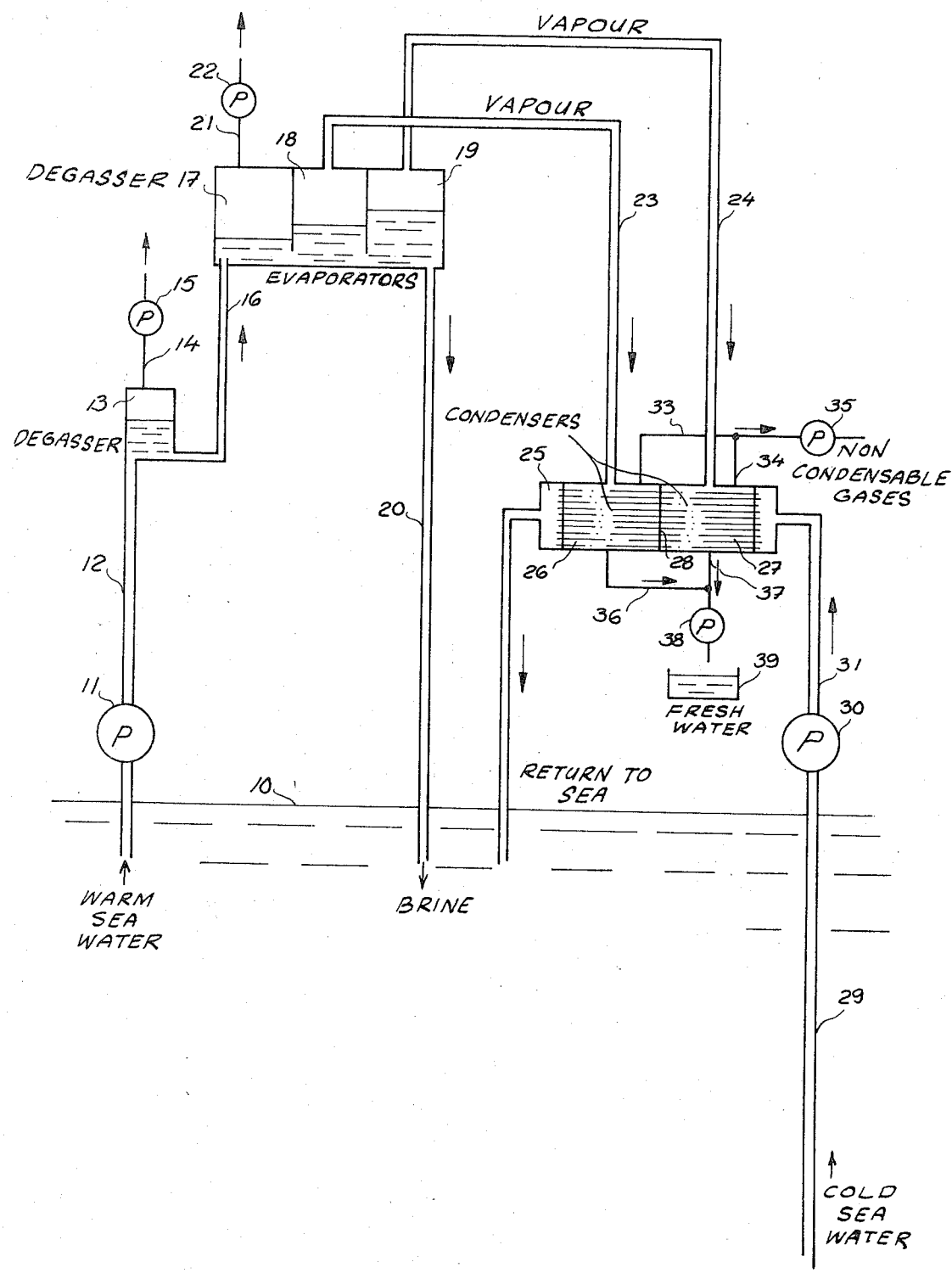
FIG. 1 is a diagram of one embodiment of the method of distilling seawater in several stages. For simplicity's sake it shows only two stages but in practice there can be more than two stages.

In FIG. 1, warm surface water from the sea is evaporated in evaporators 18 and 19 at a roughly barometric height from sea level and the vapor produced is condensed by a condenser 25 in condenser stages 26 and 27. The water to be evaporated is taken from the sea by a pump 11 and flows through a pipe 12 to a degasser 13, and from there on through a pipe 16 to another degasser 17. The water level in the latter is higher than in the degasser 13, but lower than in the evaporator 18. From the degasser 17, the water goes to the first stage 18 and second stage 19 of the evaporator, and from there through a pipe 20 back to the sea. Alternatively, the pump 11 can be connected to the pipe 20.

Subatmospheric pressures proportional to the differences in height prevail in the degassers 13 and 17, and in any case they are greater than the water-vapor pressure in the evaporator 18. Quantities of non-condensable gasses proportional to these pressures are released in the degassers 13 and 17. In addition, a quantity of vapor is released along with the non-condensable gasses, this quantity being proportional to the ratio between the pressure of the vapor and the partial pressures of the gasses. For this reason the degassers can be placed below the evaporator to avoid removing unnecessary quantities of vapor with the gasses. The degasser can be a simple enclosed container, in the upper part of which the gasses accumulate.

When the water flows through the first stage 18 of the evaporator, part of it (e.g. 0.35%) is evaporated by extracting heat from it and the water becomes 2° C. cooler. The cooled water flows on to stage 19, in which the pressure is lower, corresponding to the lower water temperature. A corresponding amount of water evaporates here, too, and about 99.3% of the original quantity of water returns to the sea, cooled by 4° C.

The condensers for the different stages of evaporation are so arranged that the same cooling water flows through more than one, consecutively. The vapor space in condenser 25 is divided by a partition 28 into two compartments 26 and 27. Cooling water brought from the sea depths via a pipe 29, pump 30 and pipe 31 to the condenser 25 first enters the compartment 27, where it becomes warmer. From there it goes on to the compartment 26, becomes still warmer, and finally returns to the sea through a pipe 32. The vapor from the higher-temperature evaporator stage 18 flows through a pipe 23 to the compartment 26, in which the cooling water is warmer than that in the compartment 27. Similarly, the vapor from the cooler evaporator stage 19 passes through a pipe 24 to the cooler condenser stage. In this way, the same temperature difference between the vapor and cooling water can be achieved in both condenser stages.

This arrangement enables more than half of the temperature difference between the deep water and surface water to be used for evaporating the latter. If the temperature difference is 10° C., for example, and the surface water is cooled by 3° C. in each evaporator stage (6° C. in both) so that about 1% of it is evaporated, and if the cooling water becomes 3° C. warmer in each condenser stage (6° in both), then 60% of the total temperature difference is utilized for evaporation and the cooling water returns to the sea 2° C. warmer than the water returning from the evaporator 9. In this case, the temperature difference between the vapor and cooling water in the condensers averages 2.5° C. This temperature difference can be increased by employing several stages of distillation. If there are six such stages, the temperature difference in an apparatus of the type described here is 3.5° C.

As the pressure prevailing in the degassers 13 and 17 is greater than that of the water vapor, part of the non-condensable gasses dissolved in the water is released in the evaporators 18 and 19. These gasses, whose quantity is insignificant compared to the vapor, flow with the vapor to the condensers 26 and 27 and after the vapor has condensed, the gasses are removed by a pump 35 from the condensers through pipes 33 and 34. The fresh-water is taken from the condensers through pipes 36 and 37 by a pump 38 into a tank 39.

Second embodiment

Figure 2:
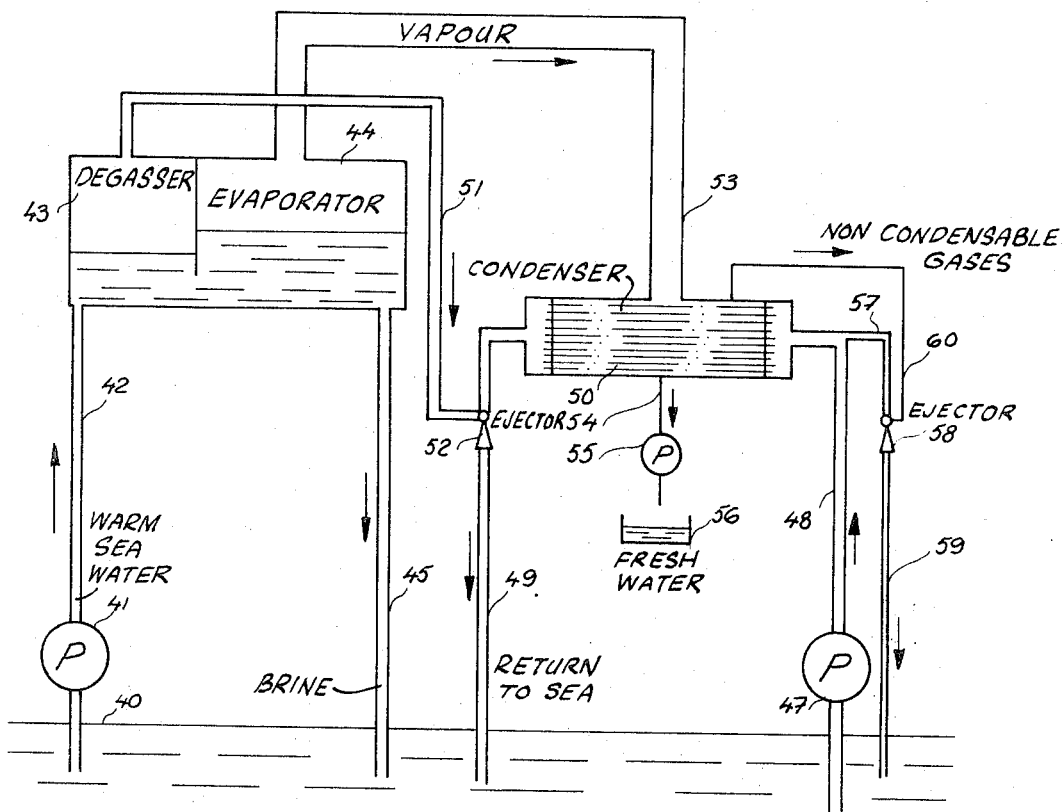
FIG. 2 illustrates another embodiment of the method, with special reference to removing the non-condensable gasses from the system, utilizing the cooling water from the condenser.

The embodiment in FIG. 2, like that in FIG. 1, includes two water flows. A pump 41 raises warm surface water up through a pipe 42 to a degasser 43, from which the water flows to an evaporator 44 and from there down a pipe 45 back to the sea. The water surface in the evaporator is at a manometric height above the seal level and the pressure prevailing in the evaporator equals the pressure of the water vapor.

A pump 47 raises water from the sea depths through pipes 46 and 48 to a condenser 50, and from there through a pipe 49 back to the sea.

The pressure in the degasser 43 is higher than that of the water vapor and most of the non-condensable gasses dissolved in the water are released from it. The condenser return pipe 49 is fitted with an ejector 52, which sucks the air from the degasser through a pipe 51 and mixes it with the water. Sufficient suction is achieved by changing the pressure energy of the water into kinetic energy in the ejector. When the flow is retarded again, part of the kinetic energy reverts to pressure and the volume of the gas bubbles decreases correspondingly. The absolute pressure in the degasser 43 can be 0.05 ata., for instance, and that in the water before the ejector 52 0.5 ata., in which case the speed of the water forced into the ejector is 9.5 m./s. The water vapor accompanying the air in the ejector 52 is condensed, the flow rate is reduced and the air bubbles are compressed. The flow from the ejector 52 into the pipe 49 can be 3 m./s. and the absolute pressure 0.35 ata. If the density of the mixture at the suction inlet of the ejector is, say, 0.33 kg./dm.³, it rises to 0.9 kg./dm.³ after the ejector.

Thus the ejector 52 raises the air pressure from, say, 0.05 to 0.35 ata. and condenses the water vapor in the air. Most of the work of pumping is done by the water column flowing down from the ejector 52 through the pipe 49. The increasing hydrostatic pressure of this column compresses the air bubbles isothermically to such a small size that, before they reach the outer air, they occupy only 3.5% of the volume of the mixture in the above example, whereas previously they occupied ⅔ of it.

The water vapor flows through a conduit 53 to the condenser 50, in which it is condensed, and the fresh water is taken from the condenser by a pump 55 into a tank 56. A small quantity of non-condensable gasses flows with the water vapor into the condenser 50. This is removed through a pipe 60 to another ejector 58. A small amount of cooling water that has not flowed through the heat-exchanger tubes of the condenser 50 passes through the ejector 58 and a pipe 59 back to the sea. The ejector 58 changes the pressure energy of the water into kinetic energy, whereupon a suction pressure lower than the pressure in the condenser 50 is produced by this ejector and the air flows from the condenser to the ejector 58. The kinetic energy reverts to pressure and the air bubbles are compressed in the ejector 58 and water column 59 in the same way as described above for the ejector 52 and pipe 49.

When very large quantities of water and air are treated, the bubbles formed in an ejector mixing pipe might become so big that their buoyancy would exceed the water flow downwards if the ejector diameter was too big. This can be avoided by embodying the device shown in FIG. 3, for instance, in which the ejector is formed of several parallel pipes 62 into which air enters from the space to be evacuated through the pipes 64 and the water from the pipe 61 passes through the ring-shaped spaces between the pipes 62 and 64. Each mixing pipe 62 functions separately. To start with, the gas bubbles formed in them are proportional in size to the diameter of the pipe 64. If this size is reasonable, the bubbles flow downwards with the water, the water vapor is condensed, the flow rate falls and the pressure grows so that, by the time the bubbles enter the common pipe 63, their size is so small that they accompany the flow downwards.

Third embodiment

Figure 4:
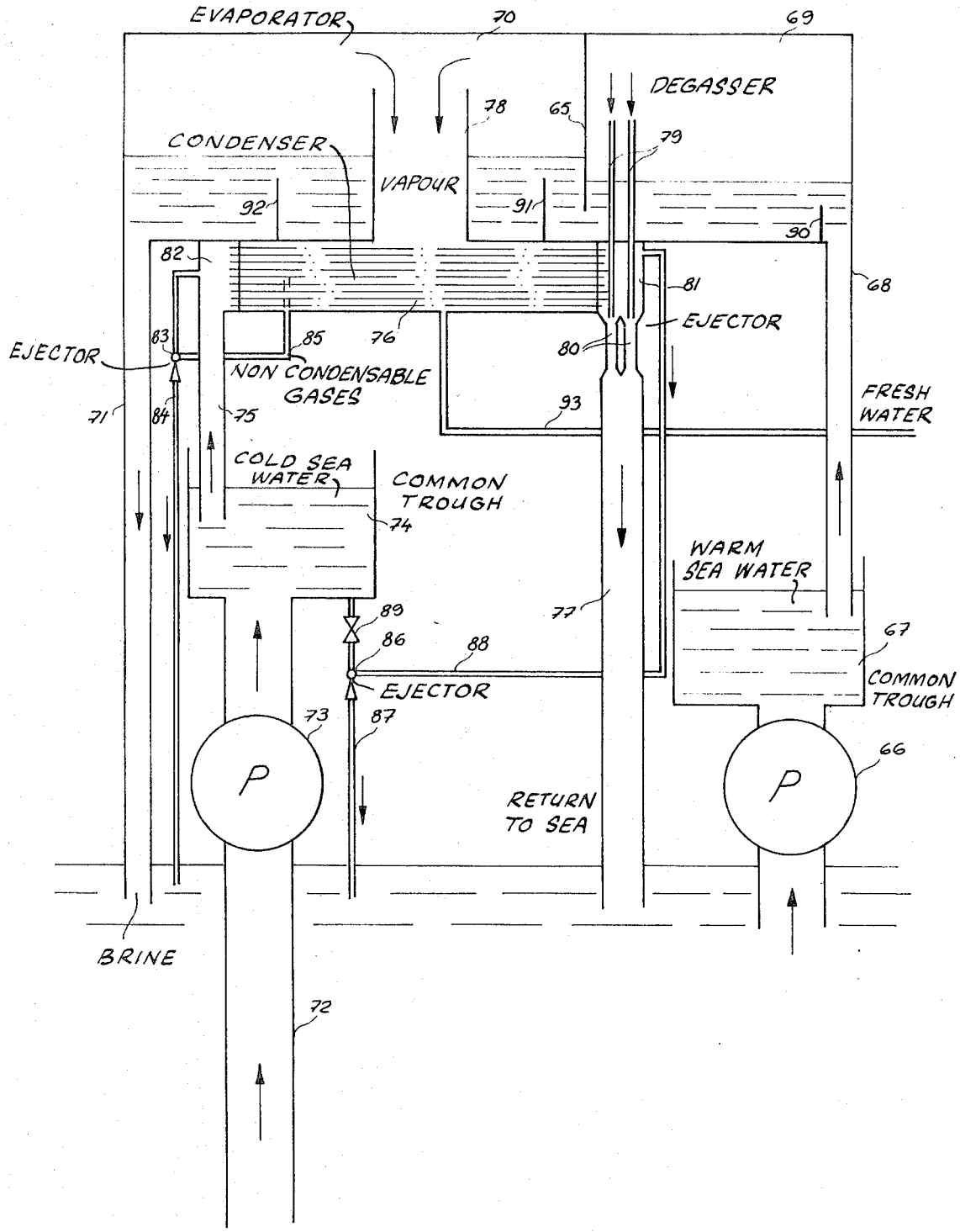
FIG. 4 shows an embodiment of the method, in which a large distilling plant formed of several modules can be built in such a way that only two pumps are needed.

It is economical to build large distilling plants of several parallel modules. FIG. 4 shows an embodiment in which a plant formed of several modules functions with the aid of only two pumps common to all the modules.

The most important parts of each molule are the evaporator 70 lying at a manometric height above sea level and, below this, the condenser 76. Warm surface water is pumped from the sea by a common pump 66 into a feed trough 67, in which the free surface of the water is at a height $h_1$ above the sea level. From here the water rises through a pipe 68 into the degasser 69 of the evaporator, in which most of the air dissolved in the water is released.

From the degasser, the water flows under the partition 65 and over the barrier 91 into the evaporator, where part of the water evaporates at subatmospheric pressure and the rest returns through a pipe 71 to the sea. The water vapor flows from the evaporator through a conduit 78, around which the water to be evaporated circulates. The rise pipe 68, degasser, evaporator and return pipe 71 form a closed syphon through which the water flows by its own weight from the trough 67 to the sea. The height $h_1$ of the water surface in the trough 67 is regulated by the pump 66 so that it corresponds to the flow losses produced in the whole syphon, to ensure an even stream of water flowing constantly through the syphon.

Similarly a pump 73 raises colder water from the sea depths through a pipe 72 into a cooling-water feed trough 74. From here water rises through a pipe 75 into the condenser 76, and after passing through the heat-exchanger tubes of the condenser it returns to the sea through a pipe 77. The pipe 75, condenser 76 and return pipe 77 form a closed syphon in which the cooling water flows evenly provided the height $h_2$ of the water in the trough 74 corresponds to the pressure losses in the syphon.

Before the plant is started up, there is air in both the evaporator 70 and the water space of the condenser 76. Thus the syphons cannot function. The plant is started up as follows: water is lifted by the pump 73 into the trough 74 and by the pump 66 into the trough 67. From the trough 74 part of the water flows through an ejector 86 into a pipe 87 and back into the sea. A pipe 88 leads from the upper part of the condenser to the ejector 86, which sucks air from the water box 81 of the condenser 76 through the pipe 88 and mixes it in the form of bubbles with the water flowing down through the pipe 87, and this water pumps the air out. The pressure in the condenser water box falls and water flows through the pipes 75 and 77 until the syphon is filled with water and the flow from the trough 74 through the syphon to the sea gets under way. After start-up, the pipe 87 can be closed either partly or wholly by a valve 89.

Figure 3:
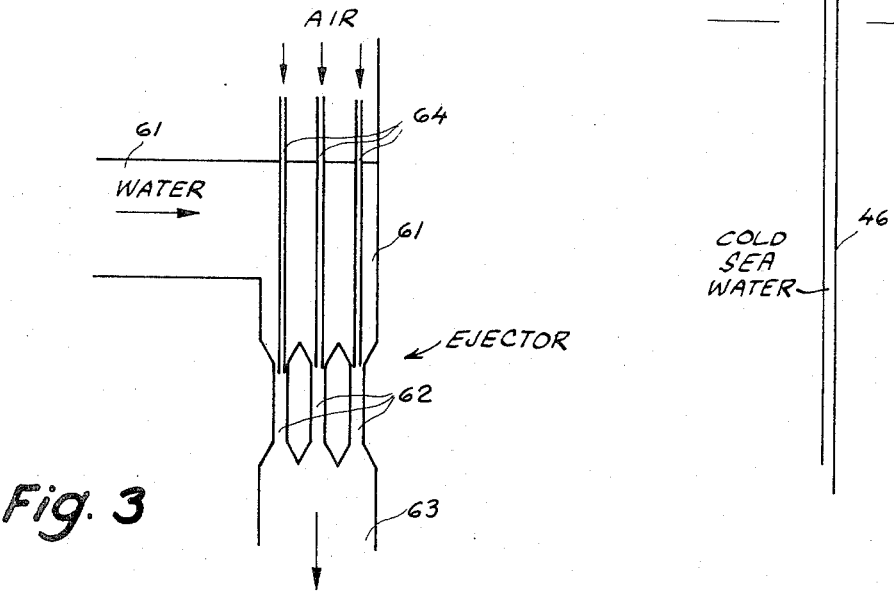
FIG. 3 shows an ejector—a detail of the method of mixing then on-condensable gasses with cooling water.

The degasser 69 is connected to the condenser return pipe by pipes 79 which, together with pipes 80, form an ejector of the type illustrated in FIG. 3 and in the same way suck air from the degasser 69, evaporator 70 and vapor space of the condenser 76 into the water flowing down through the pipe 77, so that this water takes it down with it to the sea. Ahe pressure in the evaporator 70 falls and water passes through the pipes 68 and 71 to form a uniform syphon, through which water flows from the trough 67 through the evaporator 70 to the sea. The ejector formed by the pipes 79 and 80 continues to extract air released in the degasser 69. The air accumulating in the condenser after start-up is removed by another ejector 83 through a pipe 85. The ejector 83 mixes it with the water flowing from the condenser water box 82 through the pipe 84 to the sea.

A big plant may include a score or so of modules, in all of which the evaporators are fed by a single trough 67 and the condensers by a single trough 74. In this way, the only moving parts in the entire plant are two large pumps.

The only quantities to be regulated continuously are the heights $h_1$ and $h_2$. Fluctuations in the sea level—low and high tides—can be compensated by making the water levels in the troughs 67 and 74 and in the evaporator 70 follow them. If the fluctuations are large, the water in the evaporator may become too deep for effective evaporation at high tide. This ca nbe remedied by building barriers 91 and 92 in the evaporator 70 and a barrier or barriers 90 in the degasser 69 to follow the fluctuations in the water level—for example, by means of floats. This causes the water passing through the degasser 69 and evaporator 70 to flow near enough to the water surface for vapor and non-condensable gasses to be released from it. The condensate is taken from the condenser through a pipe 93 to a freshwater network common to all the modules, not shown here.

For clarity's sake, FIG. 4 shows a distiller-plant module in a single stage. In practice it is an advantage to build it in several stages, as stated earlier. This can be achieved structurally by locating the evaporator and condenser in a single vacuum space divided into several distillation stages by thin partitions, under which water flows from one evaporator to another and through which the heat-exchanger tubes of the condensers pass.

FOURTH EMBODIMENT

Figure 5:
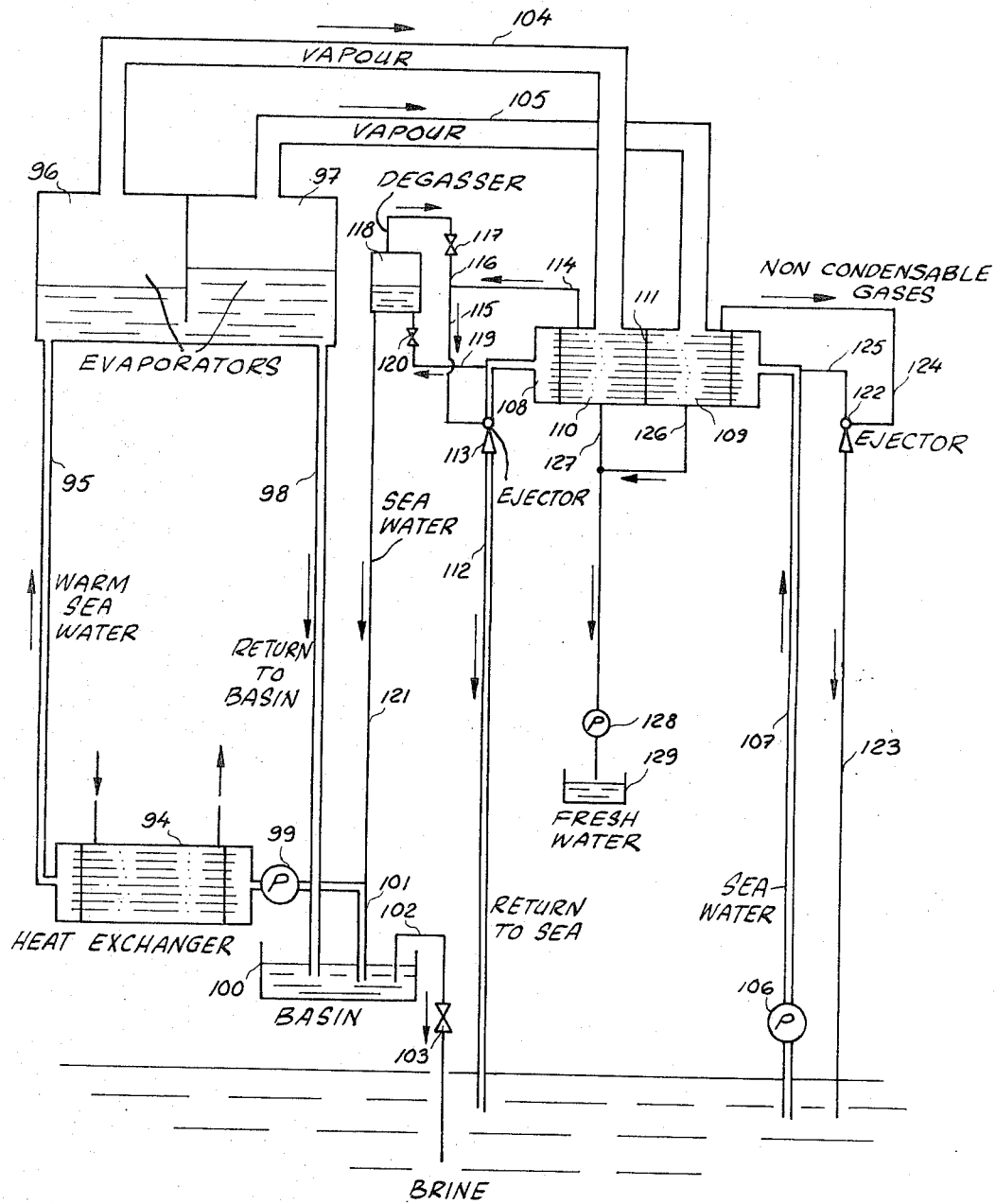
FIG. 5 shows an embodiment of the method combined with a process that produces waste heat.

In the embodiment in FIG. 5, seawater is distilled by waste heat from some process, such as a power plant or oil refinery. The heat is transferred to the seawater to be evaporated by a heat exchanger 94. A pump 99 forces the seawater through the heat exchanger 94 and a pipe 95 to evaporators 96 and 97, in each of which part of the water is evaporated and the rest returns through a pipe 98 to a basin 100. The evaporators are at a manometric height above the basin 100 and the subatmospheric pressure in them corresponds to the water vapor pressure. The pump 99 sucks water from the basin 100 through a pipe 101 back into the heat exchanger 94, in which it is rewarmed and flows back into the evaporators.

The condenser 108 is divided by a partition 111 into two parts 110 and 109 into which water vapor flows from the evaporators 96 and 97 through conduits 104 and 105. The condensate is taken by a pump 128 through pipes 127 and 126 to a freshwater tank 129. Another pump 106 feeds cooling water from the sea through a pipe 107 to the condenser 108, from which it returns to the sea through a pipe 112. The evaporated water is replaced by feeding new water from the condenser system into the evaporator system. This water passes first through a pipe 119 and valve 120 to the degasser 118, where air is released from it, and then through a pipe 121 into the evaporator system. To prevent the salt content of the evaporator system from becoming too large, the amount of water added is greater than the amount evaporated and the excess is bled off through a pipe 102 and valve 103 into the sea.

Near the top of the condenser return pipe 112 is an ejector 113 which sucks air from the degasser 118 through a valve 117 and pipes 116 and 115, and mixes it with the cooling water returning to the sea. The same ejector also extracts air from the warmer condenser stage 110 through a pipe 114 in a similar way. The pressure difference between the degasser 118 and condenser stage 110 is maintained by a valve 117. From the cooler stage 109 of the condenser, air is extracted by means of the colder cooling water. This water is taken from the condenser feed pipe 107 through a pipe 125 into an ejector 122, from which it flows through a pipe 123 into the sea. The air is sucked from the condenser stage 109 through a pipe 124 by the ejector 122.

The above are a few embodiments of the invention. For clarity in the drawings, they have been limited to one or two stages of degassing, evaporation and condensation. The method can be optimized in one or more ways in each case, depending on circumstances such as the size of the plant, the water temperatures, the possibility of damming a basin, the availability of waste-heat energy, the distance of the cooling water to be pumped, the amount of gasses dissolved in the water and the price of the equipment and energy. The parameters for this optimization are the number of evaporation stages, the proportion of warm water to be evaporated, the number of condensers, the quantities and temperatures of the cooling water flowing through the condensers, the number of degassing stages and the pressure prevailing in them, and the technique used to pump out the noncondensable gases.

What is claimed is:

1. An apparatus for producing freshwater by distilling seawater continuously, comprising a common first trough above the sea level; means for raising warm seawater from the sea to the common first trough; a common second trough above the sea level; means for raising cold seawater from the sea to the common second trough; and a plurality of distilling units connected in parallel, each distilling unit comprising:
    a closed chamber above the sea level provided with a plurality of partition walls open near the bottom of the chamber to divide the chamber into at least one degassing chamber and a plurality of evaporation chambers communicating with each other;
    a first inlet tube connected to the bottom of the first degassing chamber to suck warm seawater from the common first trough;
    a first outlet tube connected to the bottom of the last evaporation chamber to conduct waste water downwards to a discharge point substantially lower than the level of the water in the first trough in order to create suction in the first inlet tube;
    a heat exchanger, the vapor space of which is divided by partition walls into a plurality of condensation chambers communicating with the corresponding vapor spaces of the evaporation chambers;

a second inlet tube connected to the heat exchanger to suck cold water from the common second trough;

a second oulet tube connected to the heat exchanger to conduct the cold seawater utilized to condense the vapor in the condensation chambers by indirect heat exchange to the sea in order to create suction in the second inlet tube;

means for removing non-condensable gasses released in the degassing chamber;

means for removing non-condensable gasses from the condensation chambers; and means for collecting condensed freshwater from the condensation chambers.

2. The apparatus of claim 1, in which the means for removing the non-condensable gasses released in the degassing chamber comprises an ejector in the second outlet tube having a plurality of parallel tubes in the second outlet tube and a plurality of degassing tubes connected respectively at their inlets to the upper part of the degassing chamber and at their outlets to corresponding inlets of ejector tubes, in order to mix the non-condensable gasses from the degassing chamber with the downward flow of the water in the ejector tubes and to decrease the size of the bubbles before the flow in the ejector tubes is combined into the flow through a common second outlet tube.

3. The apparatus of claim 1 further comprising:

a return conduit for recycling part of the cold seawater from the common second trough to the sea;

means in the return conduit for adjusting the flow through said return conduit;

an ejector in the return conduit; and an evacuation tube, the inlet of said evacuation tube being connected to the liquid side of the heat exchanger and the outlet of said evacuation tube being connected to the ejector in the return conduit in order to mix air from the liquid side of the heat exchanger with the downward flow of cold water in the return conduit to initiate the suction in the first inlet tube.

4. The apparatus of claim 1, in which the bottom of the degassing and evaporation spaces comprise flow barriers adapted to follow variations in level of the water surface in the closed chamber.

5. A method of producing freshwater by distilling seawater continuously, comprising:

heating seawater by indirect heat exchange with a heating medium to obtain warm seawater;

feeding a continuous flow of the warm seawater upwards through a first barometric column to a plurality of evaporation stages;

passing the warm seawater through each evaporation stage in turn, and maintaining in the evaporation stages gradually decreasing pressures, corresponding to the gradually decreasing pressure of the water vapor therein to evaporate a small part of the water;

feeding the unevaporated seawater from the last evaporation stage downwards through a second barometric column;

conducting the vapors from each evaporation stage separately to a corresponding condensation stage in which the vapors are condensed into freshwater by indirect heat exchange, using as a coolant medium a continuous stream of cold seawater brought from and returned to the sea through pipes separate from said first and second barometric columns;

removing the non-condensable gasses released on the vaporization of the warm seawater from the condensation stages into which they have flowed together with the vapors from the evaporation stages; and collecting the freshwater from the condensation stages.

6. The method of claim 5 wherein the noncondensable gasses are combined with the stream of cold water for return to the sea by mixing the gasses in the form of bubbles with the stream of cold water at a point at which the pressure of the cold water is less than the pressure of the gasses and adjusting the flow velocity of the cold water so that it is greater than the rising velocity of the bubbles to compress the bubbles by the increasing hydrostatic pressure of the downward flow of cold water.

7. The method of claim 6 wherein the warm seawater is fed to at least one degassing space to release the bulk of non-condensable gasses dissolved in the warm water before feeding the warm seawater to the first evaporation stage.

8. Apparatus for producing freshwater by distilling seawater continuously, comprising:

a heat exchanger for heating seawater by indirect heat exchange with a heating medium to obtain warm seawater;

a first barometric column for feeding a continuous flow of said warm seawater upwards;

a plurality of evaporators for receiving the warm seawater from said first barometric column and means for maintaining gradually decreasing pressures in the evaporators of said plurality of evaporators corresponding to the gradually decreasing pressure of water vapor therein to evaporate a small part of the water;

a second barometric column for feeding seawater from the last of said evaporators back to the sea;

means for heating the unevaporated seawater from the last evaporation stage and recycling the flow to the first column;

means for feeding fresh seawater to a degassing stage to release the bulk of the non-condensable gasses dissolved in the fresh seawater;

means for combining the degassified water from the degassing stage as make-up water with the circulating seawater;

means for discharging a small amount of unevaporated circulating seawater to prevent excessive increase of brine in the circulating water;

a condenser corresponding to each of said evaporators and conduits for conducting vapor from each evaporator to a corresponding condenser;

pipe means for circulating cold water from the sea to and through said condensers to condense vapors therein into freshwater and means for collecting freshwater produced by said condensation;

means for removing noncondensable gasses released on the vaporization of said warm seawater from said condensers; and pipe means for returning cold seawater to the sea from said condensers.

References Cited
UNITED STATES PATENTS

| | | | |
|---|---|---|---|
| 3,607,666 | 9/1971 | Roller | 203—11 |
| 3,501,384 | 3/1970 | Starmer | 203—11 |
| 3,458,972 | 8/1969 | Sood | 202—176 X |
| 3,388,045 | 6/1968 | Goeldner et al. | 203—11 X |
| 3,119,752 | 1/1964 | Checkovich | 203—11 |

NORMAN YUDKOFF, Primary Examiner

D. EDWARDS, Assistant Examiner

U.S. Cl. X.R.

202—173; 203—88, 91

PO-1050
(5/69)

UNITED STATES PATENT OFFICE
CERTIFICATE OF CORRECTION

Patent No. 3,783,108      Dated January 1, 1974

Inventor(s) ESKO ENSIO HUHTA-KOIVISTO et al

It is certified that error appears in the above-identified patent and that said Letters Patent are hereby corrected as shown below:

Claim 5, after line 58; insert the following:

——heating the unevaporated sea water from the last evaporation stage and recycling the flow th the first column;

feeding fresh sea water to a degassing stage to release the bulk of the non-condensable gasses dissolved in the fresh sea water;

combining the degassified water from the degassing stage as make-up water with the circulating sea water;

discharging a small amount of unevaporated circulating sea water to prevent excessive increase of brine in the circulating water;——

Signed and sealed this 5th day of november 1974.

(SEAL)
Attest:

McCOY M. GIBSON JR.            C. MARSHALL DANN
Attesting Officer               Commissioner of Patents